United States Patent [19]

Post

[11] 4,240,579
[45] Dec. 23, 1980

[54] THERMOSTATICALLY CONTROLLED HEATING SYSTEM

[76] Inventor: Arnold R. Post, 133 Pelham Rd., Philadelphia, Pa. 19119

[21] Appl. No.: 953,005

[22] Filed: Oct. 20, 1978

[51] Int. Cl.³ .............................................. F24D 5/10
[52] U.S. Cl. .................................. 236/10; 236/21 R; 337/339
[58] Field of Search ...................... 236/1 A, 10, 21 R; 431/21, 78; 337/333, 339, 298; 200/61, 6; 307/117

[56] References Cited

U.S. PATENT DOCUMENTS

| | | | |
|---|---|---|---|
| 1,703,537 | 2/1929 | Metcalfe | 431/21 X |
| 1,969,113 | 8/1934 | Baker | 236/11 |
| 2,669,664 | 2/1954 | Poznik | 307/117 X |
| 2,801,055 | 7/1957 | Seifert | 236/9 R |
| 3,273,625 | 9/1966 | Holtzman et al. | 236/1.6 |
| 3,921,899 | 11/1975 | Hamilton | 236/9 A |

OTHER PUBLICATIONS

Electric Controls for Air Conditioning, B. C. Langley, Prentice-Hall Inc., 1974, TP 492,7,L3, pp. 78 & 79.

*Primary Examiner*—William E. Wayner
*Attorney, Agent, or Firm*—Goerge A. Smith, Jr.

[57] ABSTRACT

Efficiency of domestic heating systems is improved by a flue temperature responsive switch for intermittently shutting down the burner when temperature conditions are such as would cause extended operation of the burner in the absence of the switch. The temperature at which shut-down occurs is adjustable, and the temperature at which burner operation is reestablished is dependent on the shut-down temperature. However, the minimum temperature at which burner operation is reestablished by the switch is fixed at the time of installation of the switch by securing a control knob having a stop at a selected position on a control shaft which adjusts the shut-down temperature. The switch contacts are constructed so that the switch closes if any of its principal movable parts fail.

11 Claims, 13 Drawing Figures

THERMOSTATICALLY CONTROLLED HEATING SYSTEM

SUMMARY OF THE INVENTION

This invention relates to thermostatically controlled heating systems and particularly to an auxiliary control for improving the efficiency of these systems.

A typical modern fluid-fired (i.e. gas or oil fired) heating system designed for domestic use comprises a furnace having fuel burning means, flue means arranged to carry away combustion products of the fuel burned in the burning means, heat exchange means for conducting heat away from the furnace to occupied parts of the building remote from the furnace, and controllable means for effecting intermittent burning of fuel in the burning means. Temperature-sensitive control means located in a remote part of the building are connected to the controllable means, and adapted to shut off the fuel burning means when the temperature in the remote part of the building reaches a first predetermined limit and to turn on the fuel burning means when the temperature falls to a second predetermined limit. A limit switch, responsive to the heat exchanger temperature, is provided for overriding the operation of said temperature-sensitive means when the heat exchanger temperature rises to a third predetermined limit and shutting down the fuel burning means irrespective of the condition of the temperature-sensitive control means until the heat exchanger temperature falls to a fourth predetermined limit. In the normal operation of the typical heating system, the burner operates intermittently under the control of the temperature-sensitive means. The limit switch rarely, if ever, operates.

In most systems, the remote temperature-sensitive control is manually adjustable, and, in many cases, a timer is provided for automatically reducing the building temperature at night and raising the building temperature during the day.

In the steady-state operation of these conventional systems, the time during which the burner operates in each cycle of operation is limited to a relatively narrow range, and the maximum flue temperature in each cycle is accordingly limited. However, if the remote temperature-sensitive control is adjusted either manually or under timer control to call for more heat, or if a sudden increase in heat demand occurs because of a drop in the outdoor temperature or because a door or window is left open in cold weather, the burner will be required to operate for a much longer period of time in its cycle. The extended operation of the burner under these circumstances produces unnecessarily high flue temperatures and corresponding losses by reason of inefficient transfer of heat to the heat conducting medium in the heat exchanger.

The improvement in accordance with the invention, comprises an additional temperature-sensitive control means either directly or indirectly responsive to the flue temperature and connected to override the operation of the remote temperature-sensitive control. This additional control means is adapted to shut down the burner intermittently irrespective of the condition of the remote temperature-sensitive control. The additional control is set to cut off operation of the burner at a predetermined maximum flue temperature above the normal steady-state maximum flue temperature but below the flue temperature at which the limit switch operates to shut down the burner.

The additional temperature-sensitive control imposes a limit on the flue temperature, and causes intermittent operation of the burner to take place when a sudden increase in heat demand takes place. With the additional temperature-sensitive control in operation, the building does not reach the desired temperature as quickly as it otherwise would. However, even though the time required for warm-up is increased, a saving in fuel is achieved because the amount of heat lost through the flue is limited.

Another important feature of the invention is the fail-safe structure of the auxiliary temperature-sensitive device. As will appear from the Detailed Description and the drawings, the auxiliary device comprises a pair of electrical contacts which are brought into and out of engagement with each other in response to the movement of a bimetallic element. Additional sets of contacts are provided, and are arranged to close the circuit to permit burner operation if a breakage occurs either the bimetallic element or in the contact element controlled by it. The fail-safe structure of the auxiliary temperature-sensitive control serves to reduce the likelihood of frost damage to the building in the event of failure of the device.

Another important aspect of the invention resides in the provision of a manually controllable by-pass switch. This by-pass switch can be closed in order to take the auxiliary temperature-sensitive control out of operation. When the by-pass switch is closed the auxiliary device no longer places a limit on flue temperature, and the burner operation is entirely under the control of the remote temperature-sensitive device. The by-pass switch is used to provide further assurance against frost damage in the event that the building is left vacant for an extended period. In addition, the by-pass switch gives the occupant of the building the option to effect the fastest possible warm-up of the building.

Still another important feature of the invention resides in the provision of means for establishing a minimum setting of the auxiliary control at the time of its installation, which setting is beyond the control of the occupant of the building. The minimum setting is established by means of a specially constructed control knob, which, when pressed on the control shaft of the auxiliary device, cannot be readily removed from the shaft. The knob is provided with a circular slot which cooperates with a projection extending outwardly from the control housing into the slot to establish the minimum temperature setting. The establishment of a minimum temperature setting is important in order to prevent the occupant of the building from setting the auxillary device at such a low temperature as to permit operation of the burner system at persistently low flue temperatures, which would allow the accumulation of corrosive condensates in the flue. In addition, the establishment of a minimum setting is desirable to prevent cycling of the switch in the auxiliary control under normal steady-state conditions.

The principal object of the invention is to provide a simple and highly cost-effective apparatus for achieving savings of fuel in space heating systems including, but not limited to, domestic systems.

It is also an object of the invention to effect fuel savings in space heating systems without substantially increasing the likelihood of frost damage.

A further object of the invention is to provide for fuel savings in space heating systems by limiting flue temperature and increasing the warm-up time of the building, and at the same time providing for flexible operation by permitting fast warm-up when desired.

Still another object of the invention is to achieve fuel savings in space heating systems by providing for somewhat extended warm-up times while at the same time providing for manual adjustment to balance the fuel saving against the warm-up time.

Still another object is to achieve fuel savings in a space heating system having an adjustment for balancing warm-up times against fuel savings, without substantially increasing the risk of corrosion due to persistent operation at low temperatures.

Various other objects and advantages of the invention will be apparent from the following Detailed Description when read in conjunction with the drawings.

DETAILED DESCRIPTION

Figure 1:
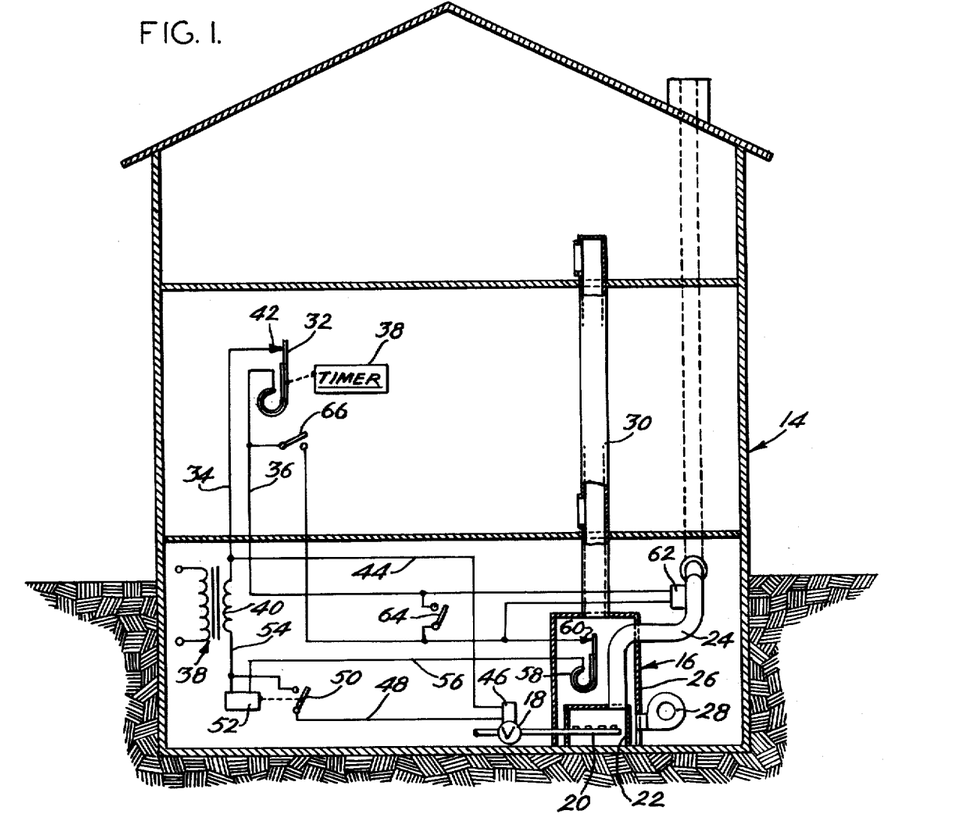
FIG. 1 is a schematic diagram of a thermostatically controlled heating system embodying the invention.

Building 14 of FIG. 1 is heated by a gas-fired furnace 16, gas being delivered through solenoid operated valve 18 to burner 20 within combustion chamber 22 of the furnace. Combustion products are carried away through flue 24. Combustion chamber 22 is surrounded by a plenum 26, which serves as a heat exchanger. Air is blown into the plenum by blower 28, and is carried to remote parts of the building through heating conduit system 30. Blower 28 can be controlled by any suitable conventional blower control system, and is preferably arranged to be turned on in response to a plenum thermostat (not shown) which insures against blower operation when the plenum is cold.

Primary control of the temperature of building 14 is achieved by temperature-sensitive control 32, which is located in a suitable part of the building remote from the location of furnace 16. Control 32 is of conventional construction, and serves to make and break the electrical connection between lines 34 and 36, depending upon the temperature at the location of the control. Temperature-sensitive control means 32 is manually adjustable within a limited range, and is also adjustable under the influence of timer 38. The timer can be set to adjust the temperature of the building to a lower level at night, and to call for higher temperatures during the daytime. A more elaborate timer may be used, which not only reduces the temperature at night, but also reduces the temperature during parts of the day when the building is unoccupied. More elaborate timer control systems can be used, involving timing devices located near the furnace, and remote from the principal temperature sensing device.

Electric current for operating the control circuitry of the system is supplied through transformer 38. One side of secondary winding 40 of the transformer is connected through line 34 to contact 42 of temperature-sensitive device 32. Line 34 is also connected through line 44 to solenoid 46 of solenoid-operated valve 18. The return for the solenoid is provided through line 48, and normally open contacts 50 of relay 52, a connection being made from the contacts 50 to secondary winding 40 through line 54. The winding of relay 52 is connected between line 54 and line 56, which leads to a safety thermostat or limit switch 58, having normally closed contacts. Thermostat 58 is located within the plenum of the furnace, and is present in order to disable the furnace in the event of excessive temperatures. Thermostat 58 never opens under normal conditions. Safety thermostats are normally designed with a high degree of inherent hysteresis so that if their contacts open at an excessive heat exchanger temperature, they do not reclose until the heat exchanger temperature falls to a very low level. This mode of operation provides a warning that something is wrong with the heating system.

In a conventional system, contact 60 of device 58 would be connected directly to line 36. In the system of FIG. 1, however, there are three parallel paths between contact 60 and line 36. The first path is through device 62, which is in contact with flue 24. Device 62 is a temperature-sensitive control means, responsive to the flue temprature. It intermittently shuts down fuel burning means 20. The other two paths are through normally open manually operable switches 64 and 66, the former beng located adjacent furnace 16, and the latter being located adjacent temperature-sensitive control 32.

Figure 5:
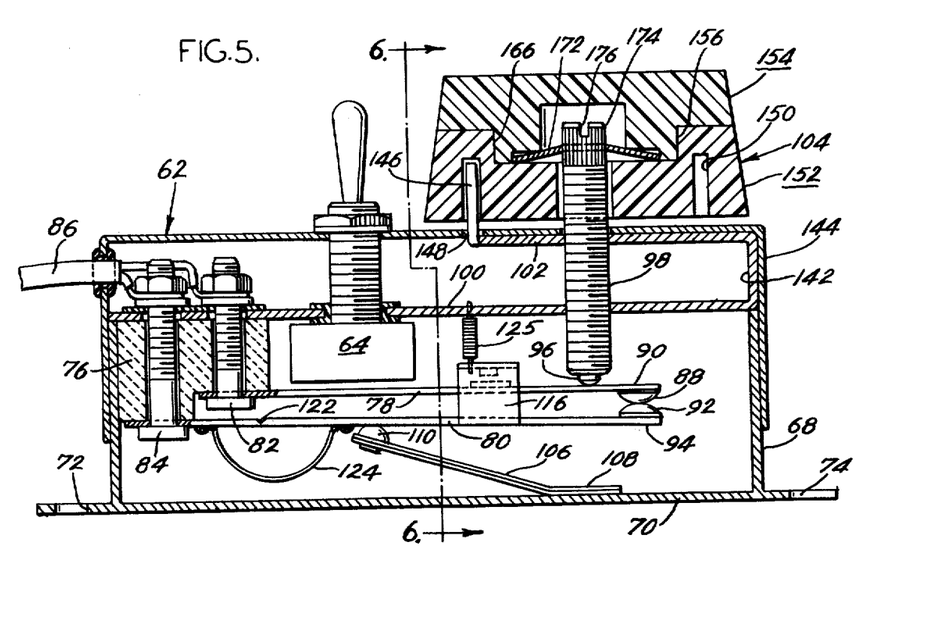
FIG. 5 is a vertical section taken through the auxiliary control used in the heating systems in accordance with the invention.
Figure 6:
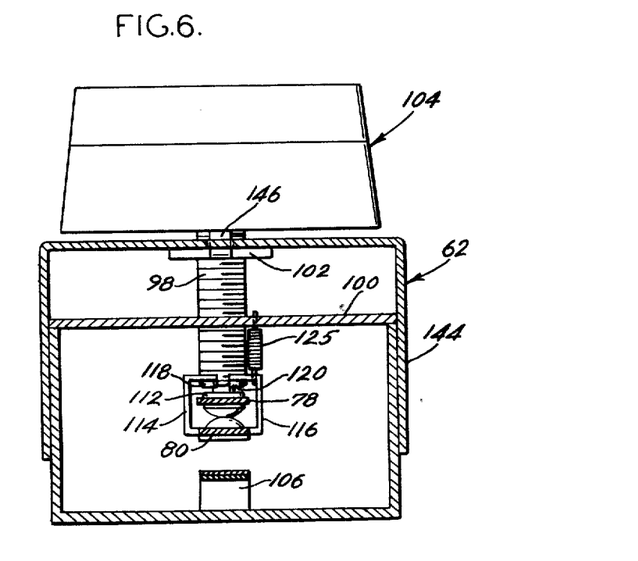
FIG. 6 is a section taken on the surface 6—6 of FIG. 5.

The details of temperature-sensitive control device 62 appear in FIGS. 5 and 6. Device 62 comprises a metal housing 68 having a base 70 which is adapted, by virtue of mounting hole 72 and mounting slot 74, to be attached by sheet metal screws to a flue. Preferably, base 70 is insulated from the flue by one or more thin layers of asbestos sheet. The purpose of the asbestos sheet is to increase the hysteresis of device 62, i.e. the difference between the flue temeperatures at which it opens and closes the burner enabling circuit.

Within the housing, mounted on a ceramic insulating block 76, are a pair of flexible metallic contact strips 78 and 80. These contact strips are secured to insulator 76 respectively by screws 82 and 84, the screws also providing terminals for electrical connections to contact strips 78 and 80 through two-wire cable 86.

Strips 78 and 80 are preferably of spring steel, or another suitable alloy exhibiting spring properties. Strip 78 has a principal contact 88 underneath its end 90 remote from screw 82, and strip 80 has a similar contact 92 at its end 94 remote from screw 84. Contacts 88 and 92 are preferably silver contacts, and are shown touching each other.

Strip 78 is biased so that its end 90 tends to move upwardly against insulating point 96 at the end of adjusting screw 98. Adjusting screw 98 is threaded in elements 100 and 102 of the housing, and is controlled by external adjusting knob 104.

Strip 80 is biased so that end 94 tends to move downwardly. The position of end 94 and contact 92 is controlled by bimetallic strip 106, the lower end 108 of which is secured o base 70. Insulator 110 at the upper end of strip 106 bears against the underside of strip 80 to move the strip up and down depending upon the flue temperature sensed by the bimetallic strip.

One of the important features of the invention resides in the fail-safe construction of temperature-sensitive device 62, which construction insures that the electrical circuit controlled by the device will be closed if a failure takes place. This fail-safe construction provides a degree of protection against frost damage, which could occur in the event of failure of device 62 if the building were left unattended in cold weather.

The fail-safe construction of the device is achieved by the provision of certain additional contacts on strips 78 and 80, and by a weakening notch in strip 80 to insure that any breakage of the strip which does occur will occur at the desired location to insure closure of the auxiliary contacts. As shown in FIG. 6, strip 78 is provided with an auxiliary silver contact 112 on its upper side, and strip 80 has a pair of ears 114 and 116 extending from its opposite sides to a location above contact 112. Ears 114 and 116 have respectively downwardly facing contact 118 and 120, which are adapted to come into contact with contact 112 to complete the circuit in the event of a failure resulting from the breakage of bimetallic strip 106. Contacts 118 and 120 are brought together with contact 112 by virtue of the downward biasing of strip 80.

Returning to FIG. 5, in order to insure against an open circuit condition in the event of breakage of contact strip 80, strip 80 is weakened by a transverse notch 122, and a flexible connecting strip 124, preferably of braided wire, bridges the weakening notch. If, by reason of metal fatigue or otherwise, contact strip 80 breaks, the break will take place at notch 122, and again, contacts 118 and 120 will come into engagement with contact 112 to close the circuit. An additional spring 125, which is a coil spring in compression between wall 100 and ear 116, urges contacts 118 and 120 into engagement with each other.

Figure 4:
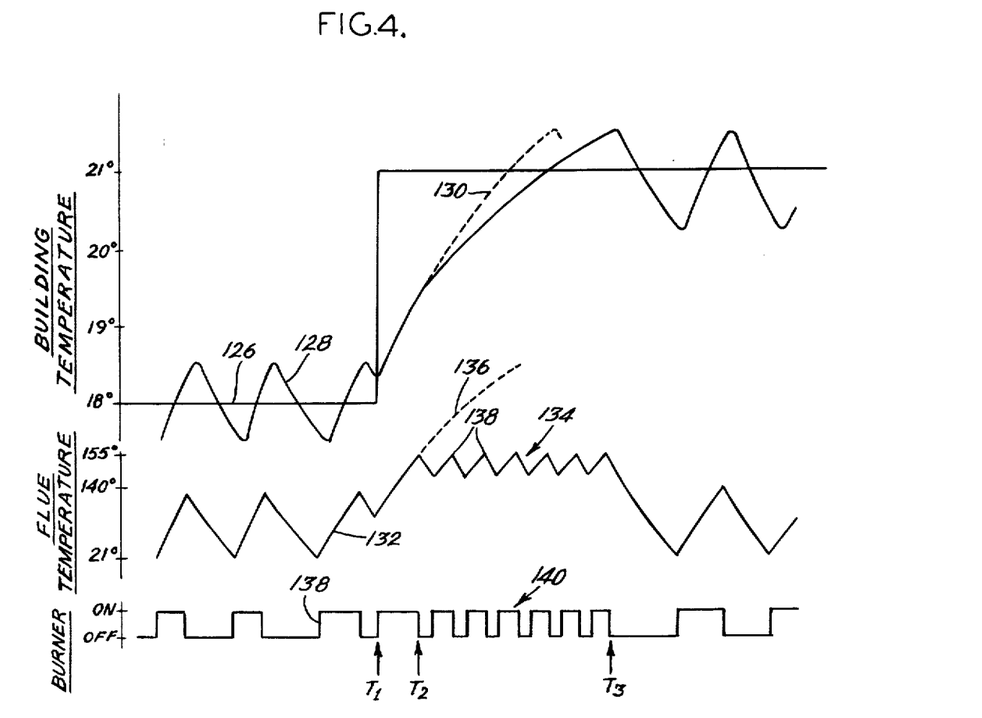
FIG. 4 is a graphical plot of building temperature and flue temperature against time, illustrating the operation of the systems of FIGS. 1, 2 and 3.

The operation of the system which has just been described is depicted in FIG. 4, in which the ordinates are building temperature, flue temperature and burner condition, as indicated, and the abscissa is time.

Solid line 126 represents the temperature called for by remote temperature-sensitive device 32. At time $T_1$, it will be assumed that the timer operates to reset device 32 to a condition such that it calls for a higher building temperature. Line 128 represents the actual building temperature in the vicinity of device 32. It will be noted that line 128 varies above and below line 126, this variation indicating that the temperature of the building continuously rises above and falls below the temperature called for by device 32 as the system operates. Broken line 130 indicates the rise in building temperature such as would occur if device 62 were disabled by closure either of switch 64 or of switch 66.

Line 132 shows the variations in the temperature of flue 24 at the location of the flue temperature sensing device 62. These variations in flue temperature correspond to the variations in building temperature, the latter lagging slightly behind the flue temperature variations. Between times $T_2$ and $T_3$, line 132 fluctuates up and down more rapidly, these fluctuations at 134 corresponding to openings and closings of the contacts of the flue temperature sensing device. Broken line 136 indicates the rise in flue temperature which would occur if device 62 were disabled.

Line 138 indicates the on and off conditions of the burner. Normally, the burner is turned on and off by the remote temperature sensing device 32. Between times $T_2$ and $T_3$, however, the burner comes under the influence of flue temperature sensing device 62, and is turned on and off at a more rapid rate.

So long as the temperature called for by temperature sensing device 32 is constant (and the outdoor temperature is either constant or nearly so) the flue temperature maximum approaches a steady-state level for a given fuel. For a called-for room temperature of 18°, for example, the maximum flue temperature for a gas furnace might be, for example, 135° at the base of the chimney. A lower outdoor temperature or a higher required indoor temperature would cause the flue temperature peaks to rise somewhat higher, perhaps to 140°. For example, if the called-for temperature is raised to 21°, the flue temperature peaks could reach a steady-state maximum of, for example, 140°.

Peaks 138 of line 132 indicate the temperature points at which flue temperature-sensitive device 62 cuts off operation of the burner to establish a maximum flue temperature. The flue temperature-sensing device is preferably set so that peaks 138 correspond to a temperature above the normal steady-state maximum flue temperature. The normal, steady-state maximum flue temperature is the maximum temperature to which the flue will rise assuming a constant outdoor temperature, and a constant temperature called for by the remote temperature sensing device 32 after the system stabilizes except when outdoor temperatures are abnormally low for the particular locality involved. A typical normal steady-state maximum flue temperature is 140°.

So long as flue temperature sensing device 62 is adjusted so that its switch contacts open at a temperature above the normal steady-state flue temperature, cycling of the temperature sensing device occurs only immediately following a rise in the heat demand. This rise in demand may be occasioned by operation of timer 38 (FIG. 1), manual resetting of temperature sensor 32, or by a sudden decrease in outdoor temperature.

Operation of device 62 causes fluctuations 134, in the flue temperature curve, which correspond to fluctuations 140 in the graph of burner operation which occur between times $T_2$ ad $T_3$. As will be apparent, fuel is consumed between times $T_2$ and $T_3$ only while the burner is on, so that the expenditure of fuel during this interval is substantially less than it would be if fuel were burned continuously over the same interval. The economic significance of the invention, however, resides in the fact that the expenditure of fuel required to raise the temperature of the building to meet the new demand indicated by line 126 with device 62 in operation, is less than the expenditure of fuel which would be required to raise the temperature of the building the same amount by burning fuel continuously and producing a building temperature rise following curve 130. Even though it takes longer, using device 62, to produce the called-for rise in building temperature, the fuel expenditure is less than woiuld be required if fuel were burned continuously. This is because device 62, in setting a limit on flue temperature, reduces loss of heat through the flue, and increases the efficiency of heat exchange in the furnace by keeping the temperature difference between the flame and the plenum at a high level.

Where timer control is used for warming up a building in the morning, for example, it may be necessary to adjust the timer to call for an increase in building temperature at a somewhat earlier time than would otherwise be necessary so that the desired temperature is reached when it is needed.

As mentioned previously, one of the important aspects of the invention relates to the matter of setting a minimum on the temperature at which device 62 cuts off burner operation. It is necessary to establish this minimum in order to prevent extended operation of the burner at abnormally low flue temperatures, which could produce corrosion by reason of accumulation of condensates in the flue. These conditions could result from attempts by the user to obtain maximum savings in fuel by setting device 62 at too low a temperature. The establishment of a minimum setting for device 62 is also desirable in order to insure against operation of the device during normal steady-state conditions, as such operation would produce excessive wear on the device itself and on various other parts of the system, particularly the solenoid valve.

In accordance with the invention, provision is made to establish a minimum setting at the time device 62 is installed.

Figure 7:
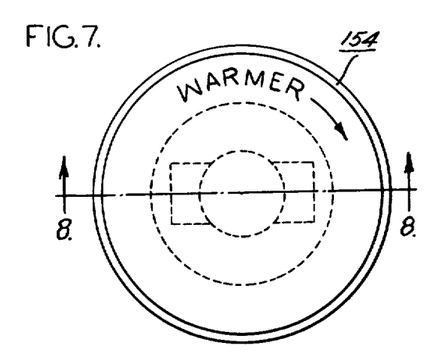
FIG. 7 is a front elevation of part of a two-part control knob of the auxiliary temperature-sensitive device.
Figure 8:
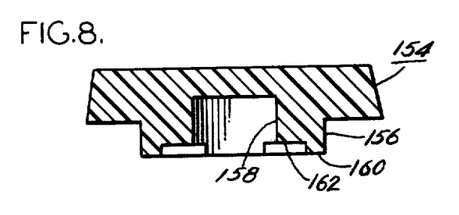
FIG. 8 is a section taken on the plane 8—8 of FIG. 7.
Figures 9, 12:
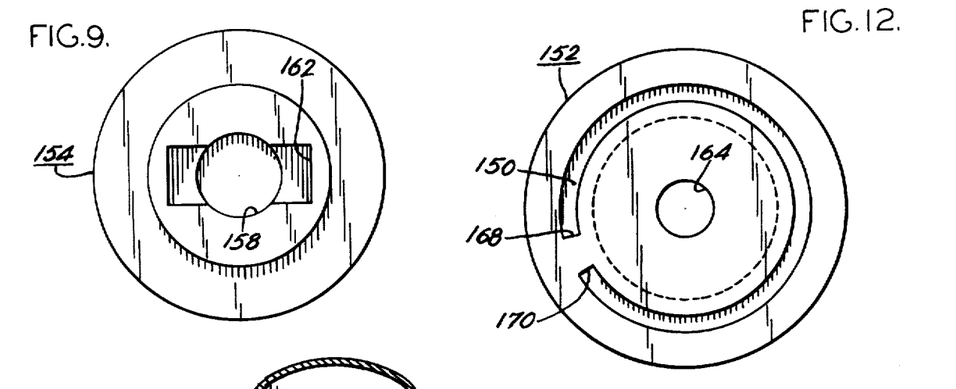
FIG. 9 is a rear elevation of the control knob element of FIG. 7.
FIG. 12 is a rear elevation of the control knob.
Figure 10:
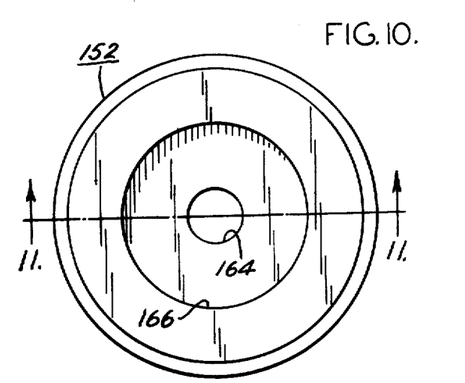
FIG. 10 is a front elevation of the other part of the two-part control knob.
Figure 11:
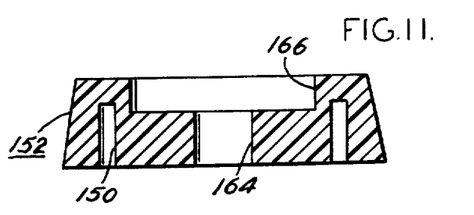
FIG. 11 is a section taken on the plane 11—11 of FIG. 10.

Referring to FIGS. 5 and 6, it will be seen that the housing of device 62 comprises a structural member 100 having a strip 102 connected to it integrally through vertical connection 142. The assembly is covered by a cover 144. Extending upwardly from strip 102 is a narrow tap 146, the tab extending through a hole 148 in cover 144, and into a circular slot 150 in the lower part 152 of two-part control knob 104. Tab 146 serves to establish a minimum temperature setting for device 62 by engagement with an end of slot 150. The details of the structure of the two-part knob will be apparent from FIGS. 7-12. The upper part 154 of the knob, as shown in FIGS. 7-9 is frusto-conical in shape, and has a downwardly extending boss 156, having a blind hole 158 open to the bottom side 160 of the boss, and a rectangular recess 162 extending across hole 158. Bottom part 152 of the knob, as shown in FIGS. 10-12 is also frusto-conical in its exterior shape, and is provided with a through hole 164 terminating in a cylindrical recess 166 in its upper side. Circular slot 150 is interrupted, having ends 168 and 170 for engaging tab 146 (FIG. 5).

Knob 104 is assembled, as shown in FIG. 5, by inserting boss 156 of part 154 into circular recess 166 of part 152, securing the two parts together by a suitable adhesive. Rectangular slot 162 (FIG. 9) holds a conventional speed nut 172 against rotation with respect to the knob. The speed nut is adapted to engage fluted upper end 174 of screw 98. The upper end of screw 98 is also provided with a slot 176 for initial adjustment before the knob is installed.

The speed nut provides for what is essentially a permanent attachment of knob 104 to screw 98. That is, the knob cannot easily be removed once it is installed. The flutes of upper end 74 of the screw provide assurance against relative rotation of the knob and screw 98. Thus, once the knob is installed on the screw, the relationship between the knob and the screw is finally established. The engagement of end 168 of slot 150 (FIG. 12) with tab 146 (FIG. 5), therefore establishes a minimum setting at which contacts 88 and 92 are opened.

Figure 13:
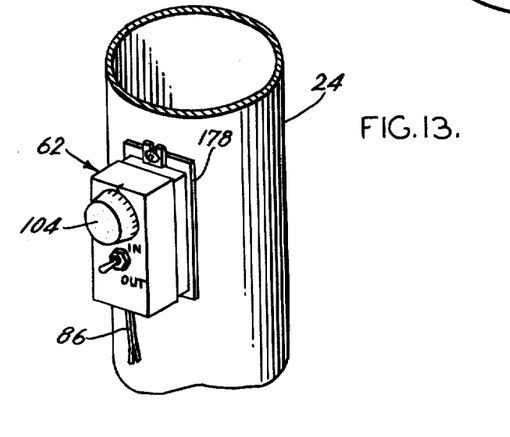
FIG. 13 is a perspective view showing the auxiliary thermostatic control as installed on a flue of a heating system of a building.

Installation of the flue temperature-sensitive control 62 is accomplished by fastening the control 62 to the flue 24 as illustrated in FIG. 13. Sheet metal screws or other suitable fasteners are used. To increase the hysteresis in the operation of the device, a layer 178 of asbestos paper or other suitable insulation material is secured between the base of device 62 and the flue.

The control is supplied with control knob 104 detached. At the time of installation, screw 98 (FIG. 5) is turned clockwise to push contact strip 78 downwardly beyond its normal position. The remote temperature-sensitive control is adjusted upwardly to call for an increase in the building temperature. Flue temperature is then monitored by a suitable measuring instrument, and when it reaches the desired level, which should be above the normal steady-state maximum, e.g. 155°, screw 98 is turned counterclockwise until contacts 90 and 92 open, cutting off the burner solenoid valve. Knob 104 is then installed, with edge 168 of its slot 150 (FIG. 12) positioned adjacent tab 146 (FIG. 5). With the knob installed in this manner, adjusting screw 98 cannot be turned counterclockwise beyond its initial setting. Thus, a fixed lower limit is placed on the temperature at which contacts 88 and 92 open. While the user can adjust the temperature at which the device operates within a limited range, he cannot adjust it to such a low level that the contacts will open and close during normal steady-state operation, or to a level so low as to allow excessive condensate to accumulate in the flue.

In a typical installation in which the building is warmed up only in the morning, the auxiliary flue temperature sensing device can be expected to produce a fuel saving of up to 10%. Greater savings can be achieved where the building is warmed up both in the morning and in the evening, and still further savings can be realized by the use of the auxiliary flue temperature sensing device in conjunction with a flue damper as illustrated in FIGS. 2 and 3.

Figure 2:
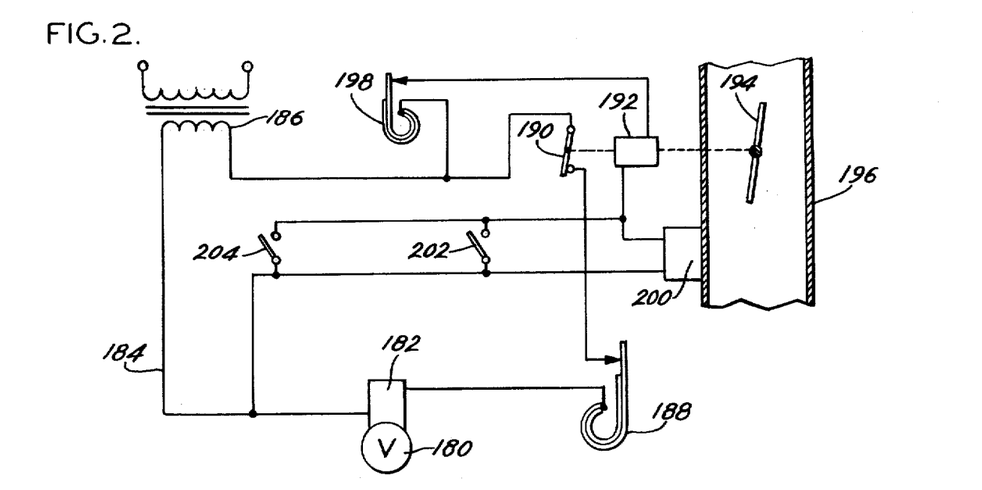
FIG. 2 is a schematic diagram showing an alternative embodiment of the invention.
Figure 3:
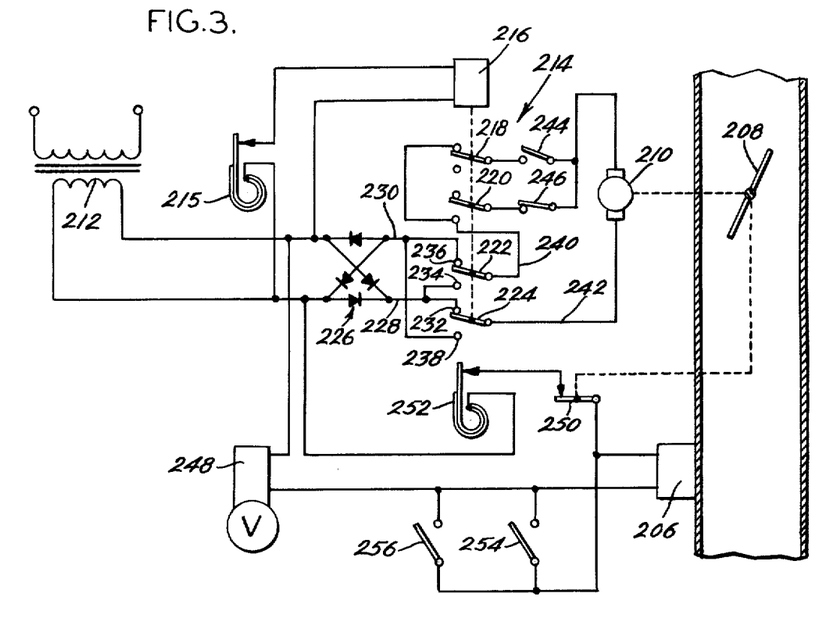
FIG. 3 is a schematic diagram showing a further alternative embodiment of the invention.

The system of FIG. 2 comprises a solenoid-operated fuel valve 180. One side of solenoid 182 is connected through line 184 to one side of the secondary of step down transformer 186. The other terminal of solenoid 182 is connected through the normally closed contacts of a furnace temperature limit switch 188, and contact 190 of solenoid 192 to the other side of the secondary transformer 196. Solenoid 192 is a fast-acting solenoid which serves a dual function in that it not only operates contacts 190, but also controls the operation of flue damper 194 in the flue 196. When solenoid 192 is energized, damper 194 is opened, and contacts 190 are closed to complete the circuit to valve solenoid 182, permitting fuel to flow to the burner.

Solenoid 192 is in series with the remote temperature sensing device 198, and flue temperature sensing device 200, the latter being identical to device 62, as shown in FIG. 5. Normally open switches 202 and 204 are provided to disable flue temperature sensor 200, and these switches are preferably, although not necessarily, located respectively adjacent the furnace, and adjacent remote temperature sensor 198.

In the operation of the system of FIG. 2, damper 194 operates in conjunction with fuel valve 180, and fuel is shut off whenever the damper is closed, whether by reason of the opening of the contacts of the remote temperature sensor 198, or by reason of the opening of the contacts of the flue temperature sensor 200. In this system, the damper prevents the loss of heat through the flue during all of the intervals in which the burner is not operating.

In the system of FIG. 3, a motor-operated flue damper is used. The motor-operated damper is slower acting than a solenoid-operated damper. The operation of the system is different from that of the system in FIG. 2 primarily in that the damper opens and closes during normal cycling of the burner, but remains open during cycling which takes place in response to operation of the flue temperature responsive means 206. Damper 208 is operated by motor 210, which is a reversible D.C. motor connected to transformer 212 through reversing circuitry generally indicated at 214. Remote temperature sensor 215 is connected in series with relay solenoid 216 across the secondary of transformer 212. Relay 216 is a four pole double-throw relay having contacts 218, 220, 222 and 224, these contacts being shown in the position in which relay solenoid 216 is energized. A bridge rectifier circuit 226, connected to the secondary of transformer 212 delivers full wave rectified D.C. to lines 228 and 230. Line 228 is connected to upper fixed contact 232 and lower fixed contact 234 of the relay, and line 230 is connected to upper fixed contact 236 and lower fixed contact 238. Lines 240 and 242 are reversed in polarity, depending upon the condition of the relay. Line 242 is connected to one side of the armature of motor 210, and line 240 is arranged to be connected to the other side of the armature through two parallel paths, the first path being through contacts 218 and motor-operated stop switch 244, and the second path being through relay contacts 220 and motor-operated stop switch 246.

Stop switch 244 is arranged to be opened when the motor shaft reaches one end of its travel, and is otherwise closed. Similarly, stop switch 246 is arranged to be opened when the motor shaft reaches the other end of its travel (corresponding to a damper closed position), and is otherwise closed as shown. In the operation of the motor-control circuitry, it will be seen that, if the contacts of remote temperature sensor 214 open, relay solenoid 216 will be deenergized, reversing the polarity of the current in lines 240 and 242. Simultaneously, relay contacts 218 will open, and relay contacts 220 close, causing the motor to operate in a direction such as to close damper 208. When damper 208 closes, contacts 246 open, cutting off current to the motor. When relay solenoid 216 is again energized, contacts 222 and 224 move to the condition in which they are shown, reversing the polarity to the motor, and current is delivered to the motor from line 240, through contacts 218 and 244 until contact 444 opens when the damper is fully opened.

Across the secondary of transformer 212, there are also connected in series burner valve solenoid 248, flue temperature sensor 206 (which is identical to the device shown in FIG. 5), switch 250, and limit switch 252, which is normally closed, and only opens when the heat conducting medium of the system reaches excessively high temperatures. Switch 250 is mechanically connected to damper 208, and is closed when the damper is fully opened, and is otherwise open. Normally open manually operable switches 254 and 256 are connected across the contacts of flue temperature sensor 206.

In the operation of the circuit of FIG. 3, solenoid-operated fuel valve 248 is opened only when switch 250 closes. This occurs only when damper 208 is fully opened. Flue temperature sensor 206 causes a cycling operation of the fuel valve when the flue temperature reaches the level predetermined in accordance with the flue temperature sensor's setting. The opening and closing of the contacts of flue temperature sensor 206 do not affect the condition of the damper.

Numerous modifications can be made to the apparatus described above. For example, temperature sensing device 62 need not be directly responsive to flue temperature, but can be made indirectly responsive to flue temperature by positioning it in the plenum of the furnace, or in any desired position in which it responds to the temperature of the heat exchange medium.

The heat exchange medium can be air in a forced air or convection system, or water or steam. Similarly, the invention is applicable to oil-fired heating systems, and heating systems using various other fluid fuels, propane being an example.

Numerous modifications can be made to the system configurations of FIGS. 1, 2 and 3, and to the structure of the flue temperature responsive control as well, without departing from the scope of the invention as defined in the following claims.

I claim:
1. In a thermostatically controlled heating system for a building comprising:
   a furnace having fuel burning means, flue means arranged to carry away combustion products of the fuel burned in said burning means, heat exchange means for conducting heat away from the furnace to remote parts of the building, and controllable means for effecting intermittent burning of fuel in said burning means;
   first temperature-sensitive control means located in a remote part of the building, said temperature-sensitive control means being connected to said controllable means and adapted to shut off said fuel burning means when the temperature in said remote part reaches a first predetermined limit, and to turn on said fuel burning means when said temperature falls to a second predetermined limit;
   means for changing said first and second predetermined limits; and
   limit switch means responsive to the heat exchanger temperature for overriding the operation of said first temperature-sensitive means when the heat exchanger temperature rises to a third predetermined limit and shutting down the fuel burning means irrespective of the condition of the first temperature-sensitive control means until the heat exchanger temperature falls to a fourth predetermined limit;
   the improvement comprising second temperature-sensitive control means, responsive to the temperature of said flue means and connected to overrride the operation of said first temperature-sensitive control means, for intermittently shutting down the fuel burning means irrespective of the condition of said first temperature-sensitive means, said second temperature-sensitive control means being set to cut off operation of said fuel burning means at a predetermined maximum flue temperature above the normal steady-state maximum flue temperature, but below the flue temperature corresponding to said third predetermined limit of the heat ex- changer temperature and to restore operation of said fuel burning means at a flue temperature corresponding to a heat exchanger temperature above said fourth predetermined limit.

2. Apparatus according to claim 1 in which said second temperature-sensitive control means comprises first electrical contact means for making and breaking an electrical circuit for intermittently shutting down said fuel burning means, temperature responsive means for controlling opening and closing movement of said first contact means, and second contact means arranged to close said electrical circuit in the event of breakage of said first contact means.

3. Apparatus according to claim 1 in which said second temperature-sensitive control means comprises first electrical contact means for making and breaking an electrical circuit for intermittently shutting down said fuel burning means, temperature responsive means for controlling opening and closing movement of said first contact means, and second contact means arranged to close said electrical circuit in the event of breakage of said first contact means, in which said first contact means comprises a flexible arm carrying a contact, said flexible arm being arranged for movement in response to said temperature responsive means and having weakening means for insuring that any breakage of said arm is likely to occur at a location permitting closing of said second contact means.

4. Apparatus according to claim 1 in which said second temperature-sensitive control means comprises first and second leaf spring means arranged in generally parallel overlying relationship, means anchoring one end of each of said leaf spring means, and means providing a contact point on each leaf spring means, the contact points being positioned and arranged to come into and out of contact with each other to make and break any electrical circuit for intermittently shutting down said fuel burning means, temperature responsive means for moving said first leaf spring means toward said second leaf spring means in order to bring said contact points together upon a decrease in temperature, additional contact means carried by said first and second leaf spring means and arranged to make electrical contact upon movement of said leaf spring means away from each other, means for urging said additional contact means toward a closed condition, weakening means for insuring that any breakage of said first leaf spring means is likely to occur at a location permitting closing of said additional contact means, and means for maintaining electrical contact between said first leaf spring and said electrical circuit in the event of breakage of said first leaf spring.

5. Apparatus according to claim 1 including means for adjusting the temperature at which said second temperature-sensitive means cuts off operation of said fuel burning means, and stop means imposing a lower limit on the temperature at which said temperature-sensitive means cuts off operation of said fuel burning means.

6. Apparatus according to claim 1 including means for adjusting the temperature at which said second temperature-sensitive means cuts off operation of said fuel burning means, and stop means imposing a lower limit on the temperature at which said temperature-sensitive means cuts off operation of said fuel burning means, said adjusting means comprising rotatable adjusting means, a manually operable knob adapted to effect rotation of said rotatable means, means for securing said knob in fixed relationship with said rotatable means and preventing disengagement of said knob from said rotatable means, and said stop means comprising means located underneath said knob for limiting rotation of said knob in a direction to reduce said lower limit.

7. Apparatus according to claim 1 including means for adjusting the temperature at which said second temperature-sensitive means cuts off operation of said fuel burning means, and stop means imposing a lower limit on the temperature at which said temperature-sensitive means cuts off operation of said fuel burning means, and said adjusting means comprising rotatable adjusting means, a manually operable knob adapted to effect rotation of said rotatable means, a speed nut within said knob for securing said knob in fixed relationship with said rotatable means and preventing disengagement of said knob from said rotatable means, and said stop means comprising means location underneath said knob for limiting rotation of said knob in a direction to reduce said lower limit.

8. Apparatus according to claim 1 including means for adjusting the temperature at which said second temperature-sensitive means cuts off operation of said fuel burning means, and stop means imposing a lower limit on the temperature at which said temperature-sensitive means cuts off operation of said fuel burning means, said adjusting means comprising rotatable adjusting means, a manually operable knob adapted to effect rotation of said rotatable means, means for securing said knob in fixed relationship with said rotatable means and preventing disengagement of said knob from said rotatable means, and said stop means comprising a circular slot in the underside of said knob, said slot having an end wall adapted to limit rotation of said knob in a direction to reduce said lower limit when engaged by a projection, and means providing a fixed projection extending into said slot and engageable by said end wall.

9. Apparatus according to claim 1 including manually operable by-pass switching means for disabling said second temperature-sensitive control means.

10. Apparatus according to claim 1 including damper means located in said flue means and means responsive to the operation of said first temperature-sensitive means for effecting closure of said damper whenever said first temperature-sensitive control means shuts off said fuel burning means and in which said second temperature-sensitive control means is connected to effect intermittent shutting down of said fuel burning means while allowing said damper to remain open.

11. Apparatus according to claim 1 including damper means located in said flue means, and means responsive to the operation of said first and second temperature-sensitive means for effecting closure of the damper means whenever said first or second temperature-sensitive means shuts off said fuel burning means.

* * * * *